Nov. 1, 1960   J. R. McCORDIC   2,958,322
NEUTRAL PUSH BUTTON TRANSMISSION CONTROL AND STARTER SWITCH
Filed Oct. 9, 1957   2 Sheets-Sheet 2
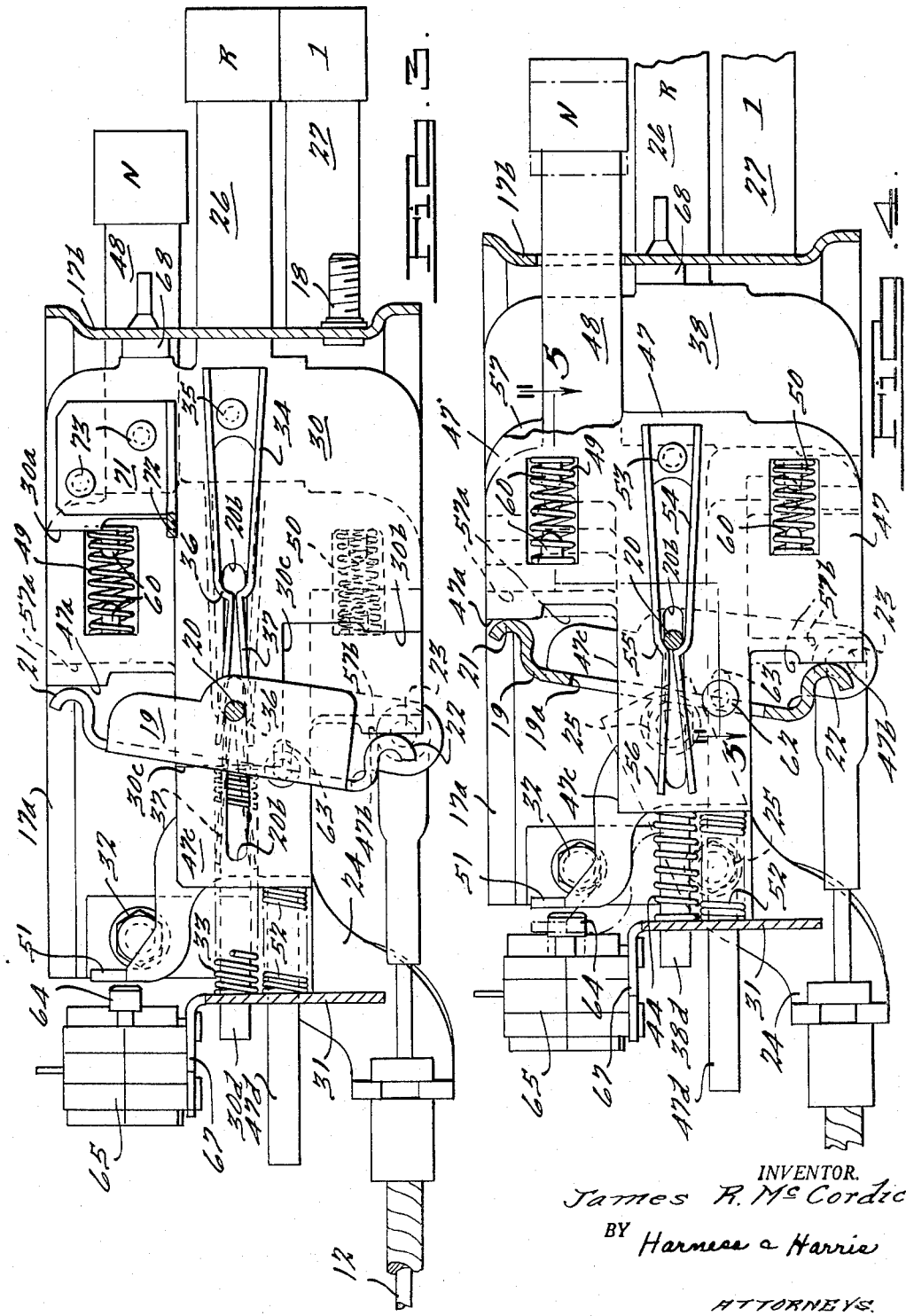
INVENTOR.
James R. McCordic.
BY Harness & Harris
ATTORNEYS.

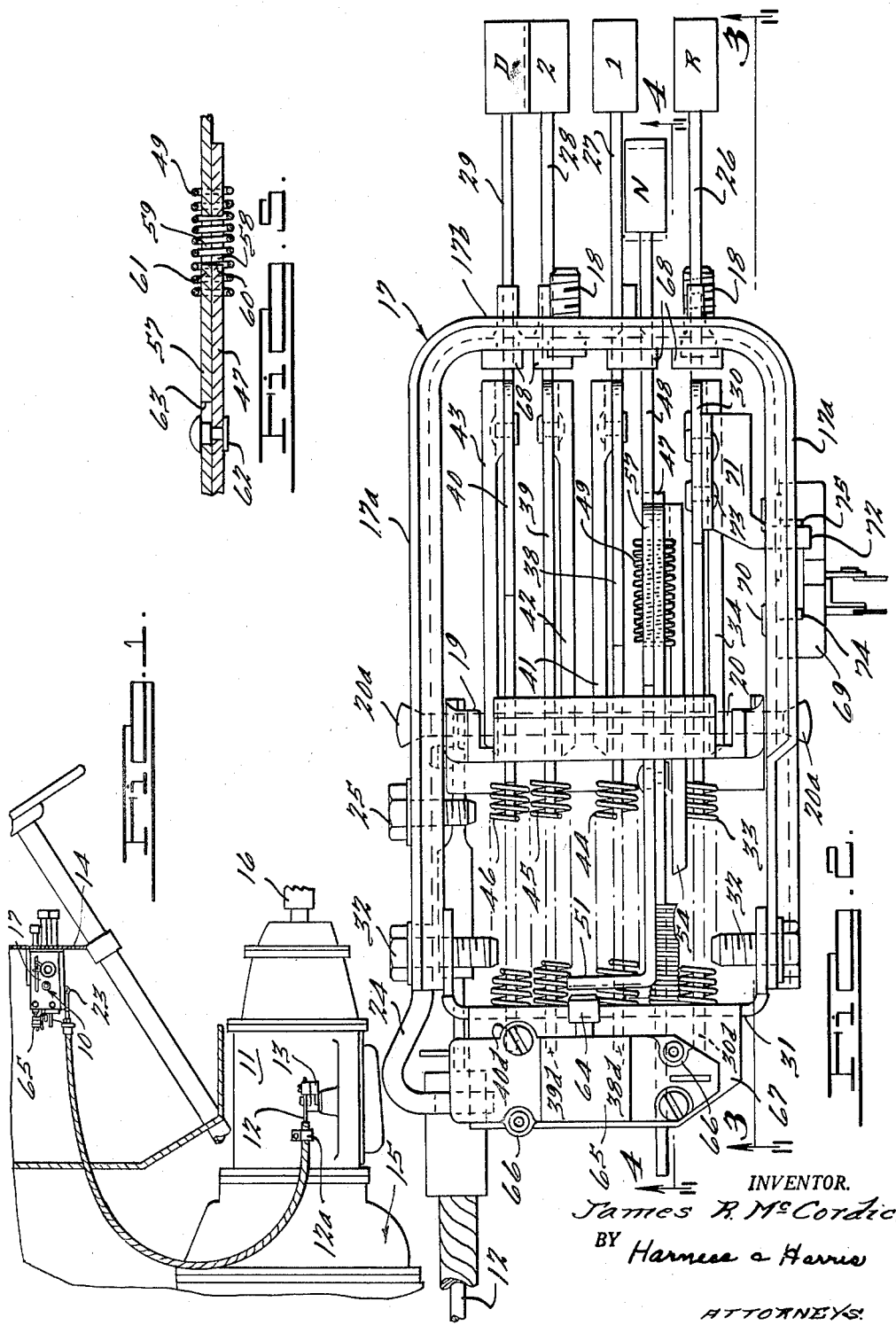

United States Patent Office 2,958,322
Patented Nov. 1, 1960

2,958,322

NEUTRAL PUSH BUTTON TRANSMISSION CONTROL AND STARTER SWITCH

James R. McCordic, Royal Oak, Mich., assignor to Chrysler Corporation, Highland Park, Mich., a corporation of Delaware Filed Oct. 9, 1957, Ser. No. 689,222

15 Claims. (Cl. 123—179)

This invention relates to improvements in a push button type control mechanism for a multiple-position transmission and a starter switch for an automobile starting motor, whereby actuation of the starter switch is dependent upon first positioning the transmission mechanism in a neutral position, and is an improvement over the structure shown in a copending application Serial No. 596,529 filed July 9, 1956.

In a common automobile construction employing a multiple-position transmission mechanism as disclosed in said copending application, a number of personally operable selectors or push buttons, including a neutral selector or push button, are provided for selectively shifting the transmission mechanism either to a desired gear-ratio position or to a neutral position, thereby to control the speed or power ratio between the vehicle engine and the driving wheels. In order to minimize the load on the customary electrical starting motor and to assure that no power will be transmitted to the driving wheels during starting of the vehicle engine, it is desirable that the transmission mechanism be in the neutral position when the starting motor is energized.

An important object of the present invention is to provide a particularly simple, compact, economical, and readily fabricated construction in a transmission control mechanism which is cooperable with an electrical switch for energizing the starting motor, whereby the latter can be energized only after the neutral selector and transmission mechanism are shifted to a neutral position.

Another object is to provide an improved neutral operating lever and starter switch arrangement wherein the lever is resiliently connected with a transmission control means, which in turn is operatively associated with the transmission mechanism to shift the same, the operating selector being effective to shift the control means and transmission mechanism to their neutral positions and being also adapted to override the control means at the neutral position, thereby to move to another position to actuate the starter switch and energize the starting motor.

Still another and more specific object is to provide operating means of the foregoing character for a transmission mechanism and starter switch wherein the operating selector and control means are each provided with enlarged substantially coextensive plate-like portions of comparatively broad area. The latter portions extend side-by-side in mutually supporting relationship within a housing adapted to be mounted forwardly of the customary vehicle dash panel. The operating selector extends forwardly from the neutral push button to which it is secured and into the housing, whereat the selector enlarges to comprise one of the aforesaid plate-like portions. Forward of its enlarged plate-like portion, the selector terminates in a transverse switch operating boss.

One of a pair of coil springs is seated within a pair of coextensive longitudinally extending upper openings in the enlarged portions of the control means and selector, the other coil spring being seated within a similar pair of coextensive longitudinally extending lower openings in said enlarged portions. The opposite ends of each spring yieldingly press against juxtaposed edge portions of both the control means and selector at the longitudinally opposed ends of its associated pair of openings to resist relative movement between the control means and selector. Thus upon forward movement of the neutral push button to a neutral position, the control means and operating selector move in unison. At the neutral position, upper and lower selector surfaces or shoulders of the control means engage upper and lower abutment portions respectively of a vertically swinging rocker, which is operatively associated with the transmission mechanism to shift the same, so as to swing the rocker to a predetermined angular position whereat the transmission is shifted into its neutral condition.

The rocker at the neutral position serves as a stop to prevent continued forward movement of the control means beyond its neutral position. However each of the two coil springs is yieldable to permit continued forward movement of the operating selector with respect to said control means after the latter is shifted to the neutral position, thereby to enable the switch operating boss at the forward end of the selector to engage and actuate a limit switch which energizes the engine starting motor. The enlarged portion of the operating selector is also provided with upper and lower selector shoulders arranged to engage the aforesaid upper and lower abutment portions respectively of the rocker at the neutral position when the selector and its switch operating boss are moved forward to actuate the motor starting limit switch. Thus a reliable shift operating mechanism is assured and positioning of the transmission shifting rocker at the neutral position is positively accomplished when the vehicle engine starting motor is energized.

Other objects of this invention will appear in the following description and appended claims, reference being had to the accompanying drawings forming a part of this specification wherein like reference characters designate corresponding parts in the several views.

Figure 1 is a diagrammatic fragmentary elevational view of a vehicle transmission mechanism associated with a push button type control mechanism embodying the invention.

Figure 2 is an enlarged fragmentary plan view showing the push button control mechanism of Figure 1 removed from the vehicle body and also showing the neutral operating selector in the neutral position.

Figure 3 is a sectional view taken in the direction of the arrows substantially along the line 3—3 of Figure 2.

Figure 4 is a sectional view taken in the direction of the arrows substantially along the line 4—4 of Figure 2, showing the neutral operating selector in phantom at the starter switch actuating position.

Figure 5 is a fragmentary sectional view taken in the direction of the arrows substantially along the line 5—5 of Figure 4.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a push button operated transmission control mechanism 10 is operatively connected with an automobile transmission mechanism, indicated generally by the numeral 11, by means of a sheathed Bowden cable 12 connected to a movable gearshift lever 13. In the present instance the transmission control mechanism is mounted below the vehicle cowl forwardly of the dash panel 14 and is provided with five manually operable selectors extending through the dash panel and terminating in push buttons identified by the letters R, N, 1, 2, and D, Figure 2, selectively operable to shift the transmission mechanism to operating positions commonly designated as reverse, neutral, low or first gear, second gear, and drive, respectively.

In the reverse, first, second or drive positions, the transmission 11 operatively connects the engine assembly 15 with the drive shaft 16, which in turn is connected through a differential with the vehicle driving wheels, all in a manner well known to the art. In the neutral position of the transmission 11, the engine assembly 15 and driveshaft 16 are disconnected from each other, enabling the engine to be started and raced without transmitting power to the driving wheels. The construction described thus far may be conventional and is accordingly not described in further detail. A fragment of the steering wheel and column are shown in Figure 1 to facilitate orientation of the structure described.

As seen in Figure 2, the transmission control mechanism 10 comprises a formed U-shaped sheet metal housing 17 having vertical side walls 17a joined at their rearward ends by a vertical end wall 17b. Thus the operating elements for the transmission control mechanism are enclosed on three sides and suitable means such as the bolts 18 extending through the wall 17b are readily provided for mounting the assembly to brackets of the vehicle body structure immediately forwardly of the dash panel 14. A vertically swinging rocker member 19 having a large central opening 19a, Figures 3 and 4, is pivotally mounted on a horizontal pivot shaft 20 which extends through the opposite side walls 17a and is secured in position by its swaged ends 20a. Above and below the shaft 20, the upper and lower edges of the rocker 19 extend transversely between the walls 17a and are shaped to provide rearwardly arched abutments 21 and 22, respectively. A lower portion of the member 19 at a location laterally of the abutment 22 is secured at 23 to the upper end of cable 12. A bracket 24 bolted at 25 to one of the housing side walls 17a is also suitably secured in supporting relation to the upper end of the sheath of cable 12, Figures 3 and 4, the lower end of the sheath being suitably secured at 12a to the housing for the transmission 11 adjacent the lever 13. It is apparent that upon swinging of member 19 about the axis of shaft 20, the connection 23 with cable 12 will shift the latter and thereby cause shifting of lever 13 and the transmission mechanism 11.

In order to swing the member 19, an operating selector means is associated with each of the push buttons R, N, 1, 2, and D. The push buttons R, 1, 2, and D are secured to the rearward ends of their plate steel operating shafts 26, 27, 28, and 29, respectively, which extend forwardly through the dash panel and into the housing 17 through wall 17b. Within the housing 17, the shaft 26 for the reverse button R enlarges to provide an integral transmission-position selector element 30 having forward upper and lower selector surfaces or shoulders 30a and 30b adapted to engage the abutments 21 and 22, respectively, Figure 3, upon forward movement of the button R. The shoulders 30a and 30b are offset from each other longitudinally of the element 30, so that when these shoulders move into engagement with the abutments 21 and 22, the rocker member 19 will be swung to a predetermined inclined position, causing shifting of cable 12 to a reverse position. Thereafter continued forward movement of button R is prevented by the movement limiting action of the abutments 21 and 22 engaging the shoulders 30a and 30b.

An integral central portion 30c of the shaft 26 extends forwardly from the shoulders 30a and 30b and terminates in a vertically reduced spring retainer 30d which projects through a forward end wall and guide plate 31 suitably secured across the ends of the channel walls 17a by bolts 32. The plate 31 is apertured to enable the passage of the extension 30d therethrough and is dimensioned to support and guide the latter closely during longitudinal reciprocating movement. A coil spring 33 around the retainer 30d and under compression between the forward plate 31 and the shoulder at the juncture of the retainer 30d with extension 30c yieldingly urges the selector element 30 and push button R rearwardly to the position shown in Figures 2 and 3.

The selector element 30 is releasably retained in its forward position against the tension of spring 33, with the shoulders 30a and 30b engaging the abutments 21 and 22, by means of a spring detent 34 secured at 35 to one side of the selector element 30, Figure 3. Upper and lower spring arms of the detent 34 extend forwardly from the point of attachment 35 and converge toward each other at intermediate portions 36. From the portions 36, the upper and lower spring arms comprise diverging portions 37 which extend forwardly above and below the pivot shaft 20 and resiliently engage the latter. When the button R is in the position shown, Figure 3, the upper and lower intermediate portions 36 yieldingly engage each other. Upon forward movement of the button R, the intermediate portions 36 are cammed apart as the forward extensions 37 ride along the pivot shaft 20. At the limit of forward movement whereat the shoulders 30a and 30b engage the abutments 21 and 22, the intermediate spring portions 36 are located immediately forwardly of the shaft 20 and are thus enabled to spring together and yieldingly engage the shaft 20 in a detent action so as to lock the selector element 30 and button R in their foremost transmission actuating position.

Integral with the operating shafts 27, 28, and 29 are corresponding transmission-position selector elements 38, 39, and 40, Figure 2, which are similar in construction and operation to the selector element 30, except that the angular relationships of their upper and lower selector surfaces or shoulders corresponding to the shoulders 30a and 30b are arranged to shift the rocker member 19 to different angular positions, thereby to adjust the cable 12 and lever 13 to predetermined positions corresponding to the low, second, and drive positions, respectively, of the transmission mechanism 11. Each of the selector elements 38, 39 and 40 is also associated with a spring detent 41, 42, and 43, respectively, similar to the spring detent 34, each being cooperable with its respective selector element to retain the same at its foremost limit of movement as described above in regard to the spring detent 34. Likewise each of the selector elements 38, 39, and 40 is provided with a forwardly extending spring retainer 38d, 39d, and 40d, respectively, which carry return movement springs 44, 45, and 46, respectively. The spring retainers 38, 39d, and 40d extend through mating openings in the forward plate 31 and are closely supported and guided thereby in the manner of the retainer 30d. The springs 44, 45, and 46 are associated with their respective retainers and plate 31 in the manner of spring 33 and retainer 30d to urge rearward movement of the selector elements 38, 39, and 40 and their corresponding buttons 1, 2, and D. Accordingly, the elements 38, 39, and 40 and their associated structures are not described in further detail.

The operating selector means associated with the neutral push button N comprises a thin plate steel selector element 47 and operating shaft 48, and coil springs 49 and 50, Figure 4, which couple the element 47 and shaft 48 for movement in unison and permit limited override of shaft 48 as described below. The rearward end of shaft 48 is secured to the neutral push button N, from which the shaft 48 extends forwardly through wall 17b and terminates in a transverse limit switch operating boss 51 at a location adjacent and above the forward plate 31. Similarly to the selector element 30, the neutral selector element 47 comprises a plate-like member of substantial area and extends vertically the height of the housing 17.

The forward upper and lower edges of the element 47 are formed to provide selector surfaces or shoulders 47a and 47b engageable with the abutments 21 and 22, respectively, when the element 47 is shifted forwardly to the neutral position shown in Figure 4, whereat the rocker member 19, cable 12, lever 13, and transmission mechanism 11 are in a neutral position and the engine assembly is disconnected from the drive shaft 17.

An integral forward central portion 47c of the element 47 projects at the neutral position through opening 19a and terminates in a reduced spring retainer 47d, which extends forwardly through the plate 31 in closely guided and supported relation similarly to the retainer 30d and carries a return movement spring 52 under compression between the plate 31 and the shoulder of the extension 47c at the rear of the retainer 47d, thereby to urge element 47 rearwardly from the neutral position shown. Secured at 53 to one side of the element 47 is a spring detent similar to spring detent 34. The detent 54 is provided with upper and lower spring arms having converging intermediate portions 55 and forwardly diverging extensions 56 which cooperate with the pivot shaft 20 in the manner of the corresponding spring portions 36 and 37 of the detent 34. When the neutral selector element 47 is in its forward or neutral position shown, the intermediate spring portions 55 converge immediately forwardly of shaft 20 to hold element 47 against rearward return movement urged by the tension of the spring 52.

The shaft 48 enlarges at 57 substantially coextensively with element 47, the broad plate-like portions 47 and 57, as well as the extension of the shaft 48 forward of the enlargement 57 and the selector element portion 47c, extend in side-by-side mutually supporting relationship. At locations above and below the extension 47c, the enlarged portions 47 and 57 are provided with elongated and substantially coextensive holes 58 and 59, respectively, Figure 5. Extending into each hole 58 from its opposite ends are spring retainer prongs 60 integral and coplanar with the selector element 47. Likewise extending coextensively with the prongs 60 into opposite ends of each hole 59 are spring retainer prongs 61 integral and coplanar with the enlargement 57. The coil springs 49 and 50 are seated under compression within the upper and lower pairs of holes 58 and 59, respectively, with the associated prongs 60 and 61 extending into opposite ends of the springs to retain the same in position. Accordingly, relative longitudinal movement of shaft 48 with respect to selector element 47 is resisted and these latter members move in unison until sufficient force is applied to overcome the tension of the compressed springs 49 and 50. Extending transversely through the element 47 and shaft 48 to secure the same together positively and to prevent all except relative longitudinal movement therebetween is a pin 62 having opposite flared ends flattened against the lateral or outer sides of the element 47 and shaft 48. A longitudinal movement limiting slot 63 is provided in the shaft 48 to enable limited longitudinal movement of the latter reltaive to the element 47 as described below.

In consequence of the foregoing construction, forward movement of the button N to the neutral position shown will cause simultaneous forward movement of selector element 47, by reason of the driving connection between shaft 48 and element 47 effected by springs 49 and 50, until rocker 19 is shifted to its neutral position by engagement with the shoulders 47a and 47b. Thereafter the rocker 19 will serve as a stop for element 47, whereupon continued forward pressure on the neutral push button N after the shaft 48 and selector element 47 are shifted to their neutral positions will cause continued forward movement of the shaft 48 independently of the element 47 into engagement with the plunger 64 of a limit switch 65. The latter is suitably secured, as by rivets 66, to a horizontal upper flange 67 of the plate 31. A limit switch 65 is in an operative circuit with an electric starting motor to energize the latter when plunger 64 is moved forwardly by engagement with the forward boss 51 of shaft 48, as illustrated in phantom, Figure 4. At this position of shaft 48, the upper and lower shoulder portions 57a and 57b of its integral enlarged portion 57 also engage the rocker abutments 21 and 22, when the latter are in the neutral position, and positively assure that the transmission mechanism 11 will be in its neutral condition. In order to prevent the starting motor from being energized inadvertently when the engine 15 is already running, a suitable vacuum switch operated from the engine manifold pressure can be employed in series with the starting motor. Upon release of the neutral button, springs 49 and 50 will return shaft 48 and its integral boss 51 to the neutral position, solid lines, Figure 3.

Upon subsequent operation of any of the other push buttons R, 1, 2, or D, so as to shift the rocker 19 to a different angular position, either the upper or lower abutment 21 or 22 will necessarily be swung rearwardly from the neutral position shown, thereby to force the neutral selector element 47 rearwardly and cause the abutting intermediate spring detent portions 55 to be shifted out of detent engagement with the pivot shaft 20. The neutral selector element 47 will thus be freed for rearward movement urged by the tension of spring 52 and will be returned together with shaft 48 and the neutral button to its rearmost position in abutment with one of the several rubber bumpers 68 which serve as rearward movement limiting stops for each of the selector elements. It is apparent from the similarity of construction of the various selector elements and their associated spring detents, that each selector element will be retained at its foremost transmission actuating position by its corresponding spring detent, or will be released from its spring detent to return to its rearmost position upon movement of any other push button and associated selector element to the latter's foremost position, in the manner described above with regard to the operation of the spring detent 54.

Summarizing the foregoing construction and operation, the neutral push button N is rigidly secured to the rearward end of operating shaft 48, which has a resilient driving connection with the selector element 47, comprising springs 49 and 50. Upon forward movement of any one of the push buttons from its rearmost position, the spring detent associated with any other selector element, which might happen to be at its forward position in engagement with the rocker abutments 21 and 22, will be released, thereby to permit spring urged return movement of the latter selector element. In the above regard, each of the selector elements 30, 38, 39, 40, and 47, as well as the shaft 48, is provided with a longitudinally extending slot 20b within which the shaft 20 rides upon relative movement of the latter elements. When it is desired to energize the starting motor for the engine 15, the neutral push button N must first be shifted to its neutral position and thereafter pushed forward from its neutral position to the phantom position, Figure 4. Inasmuch as forward movement of selector element 47 is blocked at the neutral position, springs 49 and 50 will be compressed to enable the additional forward movement of the shaft 48 and the latter's integral boss 51 into engagement with the limit switch plunger or actuator 64 to energize the starting motor. Upon release of the push button N, springs 49 and 50 return shaft 48 to the solid line position shown in Figure 4, whereat the transmission mechanism 11 remains in its neutral condition.

Although the following structure forms no part of the present invention, a backup light switch 69 is shown attached to one side wall 17a by rivets 70. Bracket 71 having a switch operating prong 72 is secured to the enlarged selector element 30 by rivets 73. The prong 72 is positioned to actuate switch operating fingers 74 and 75 of the switch 69. Thus upon forward movement of the reverse button R, finger 74 is actuated to turn on a backup light. Upon return of the button R to its rearmost position, finger 75 is actuated to turn off the backup light.

I claim:

1. In an automotive vehicle having an engine and power driven means, a multiple-position transmission operatively connecting said engine and driven means and being shiftable to a neutral position whereat said engine is disengaged from said driven means, switch means in an electric circuit effective to energize an electrical engine starting motor when said switch means is actuated, a transmission position-control mechanism having a shiftable selector element for shifting said mechanism to the neutral position, a shiftable shaft extending in side-by-side relationship with said element, means operatively connecting said element and shaft to shift said element and mechanism to the neutral position upon predetermined shifting of said shaft in a given direction, the last named means including spring means seated under compression within mating openings in said element and shaft and having each of opposite ends yieldingly engaging juxtaposed portions of both said element and shaft at opposite edges of said openings to resist relative movement between said element and shaft, said springs means being yieldable to enable continued movement of said shaft in said direction after said element is shifted to said neutral position, said shaft having a portion effective to actuate said switch means upon said continued movement, and movement limiting means for retaining said element at the neutral position upon said continued movement of said shaft.

2. In an automotive vehicle having an engine and power driven means, a multiple-position transmission operatively connecting said engine and driven means and being shiftable to a neutral position whereat said engine is disengaged from said driven means, switch means in an electric circuit effective to energize an electrical engine starting motor when said switch means is actuated, a transmission position-control mechanism having a shiftable selector element for shifting said mechanism to the neutral position, a shiftable shaft having a broad plate-like portion extending in side-by-side relationship with a substantially coextensive plate-like portion of said element, means operatively connecting said element and shaft to shift said element and mechanism to the neutral position upon predetermined shifting of said shaft in a given direction, the last named means including spring means seated under compression within mating openings in the plate-like portions of said shaft and element and yieldingly engaging said element and shaft to resist relative movement between said element and shaft, said spring means being yieldable to enable continued limited movement of said shaft in said direction after said element is shifted to said neutral position, said shaft having a portion effective to actuate said switch means upon said continued movement, and movement limiting means for retaining said element at the neutral position upon said continued movement of said shaft.

3. In an automotive vehicle having an engine and power driven means, a multiple-position transmission operatively connecting said engine and driven means and being shiftable to a neutral position whereat said engine is disengaged from said driven means, switch means in an electric circuit effective to energize an electrical engine starting motor when said switch means is actuated, a transmission position-control mechanism having a shiftable selector element for shifting said mechanism to the neutral position, a shiftable shaft having a broad plate-like portion extending in side-by-side relationship with a substantially coextensive plate-like portion of said element, means operatively connecting said element and shaft to shift said element and mechanism to the neutral position upon predetermined shifting of said shaft in a given direction, the last named means including a pair of coil springs, each being seated under compression within an associated pair of mating openings in the plate-like portions of said shaft and element and having its opposite ends yieldingly engaged with juxtaposed portions of both said element and shaft at opposite edges of the associated pair of openings to resist relative movement between said element and shaft, said pair of coil springs being spaced transversely of said direction and being yieldable to enable continued limited movement of said shaft in said direction after said element is shifted to said neutral position, said shaft having a portion effective to actuate said switch means upon said continued movement, and movement limiting means for retaining said element at the neutral position upon said continued movement of said shaft.

4. In an automotive vehicle having an engine and power driven means, a multiple-position transmission operatively connecting said engine and driven means and being shiftable to a neutral position whereat said engine is disengaged from said driven means, switch means in an electric circuit effective to energize an electrical engine starting motor when said switch means is actuated, a transmission position-control mechanism having a shiftable selector element for shifting said mechanism to the neutral position, a shiftable shaft having a broad plate-like portion extending in side-by-side relationship with a substantially coextensive plate-like portion of said element, means operatively connecting said element and shaft to shift said element and mechanism to the neutral position upon predetermined shifting of said shaft in a given direction, the last named means including a pair of coil springs, each being seated under compression within an associated pair of mating openings in the plate-like portions of said shaft and element and yieldingly engaging portions of both said element and shaft to resist relative movement between said element and shaft, said pair of coil springs being spaced transversely of said direction and being yieldable to enable continued limited movement of said shaft in said direction after said element is shifted to said neutral position, said shaft having a portion effective to actuate said switch means upon said continued movement.

5. An automotive transmission control assembly comprising a plurality of individually operable transmission actuating shafts, each shaft being movable between two normal positions, one of said shafts being movable also to a third position, switching means for energizing an electrical engine starting motor, said switching means being mounted in said assembly and actuatable by said one shaft when the latter is moved to its third position, a selector element shiftable between two normal positions, said selector element being engageable with a portion of said assembly to shift the same to a neutral position upon shifting of said element to one of its normal positions, and means interconnecting said one shaft and element for shifting in unison between said two normal positions including spring means seated under compression within mating openings in said element and one shaft and yieldingly engaging juxtaposed portions of both said element and one shaft to resist relative movement between said element and one shaft, said spring means being yieldable to enable continued movement of said one shaft to said third position after said element is shifted to said one normal position.

6. An automotive transmission control assembly comprising a plurality of individually operable transmission actuating shafts, each shaft being movable between two normal positions, one of said shafts being movable also to a third position, switching means for energizing an electrical engine starting motor, said switching means being mounted in said assembly and actuatable by said one shaft when the latter is moved to its third position, a selector element shiftable between two normal positions, said selector element being engageable with a portion of said assembly to shift the same to a neutral position upon shifting of said element to one of its normal positions, and means interconnecting said one shaft and element for shifting in unison between said two normal positions including spring means seated under compression within mating openings in said element and one shaft and having each of opposite ends yieldingly engaging juxtaposed portions of both said element and one shaft at opposite edges of said openings to resist relative movement between said element and one shaft, said spring means being yieldable to enable continued movement of said one shaft to said third position after said element is shifted to said one normal position, and movement limiting means for retaining said element at said one normal position upon said continued movement of said one shaft to said third position.

7. An automotive transmission control assembly comprising a plurality of individually operable transmission actuating shafts, each shaft being movable between two normal positions, one of said shafts being movable also to a third position, switching means for energizing an electrical engine starting motor, said switching means being mounted in said assembly and actuatable by said one shaft when the latter is moved to its third position, a selector element shiftable between two normal positions and having a broad plate-like portion extending in side-by-side relationship with a substantially coextensive plate-like portion of said one shaft, said selector element being engageable with a portion of said assembly to shift the same to a neutral position upon shifting of said element to one of its normal positions, and means interconnecting said one shaft and element for shifting in unison between said two normal positions including a pair of coil springs, each being seated under compression within an associated pair of mating openings in the plate-like portions of said one shaft and element and yieldingly engaging said element and said one shaft to resist relative movement between said element and one shaft, said pair of coil springs being spaced transversely of the direction of movement of said element and one shaft between their two normal positions and being yieldable to enable continued movement of said one shaft to its third position after said element is shifted to its one normal position.

8. An automobile transmission control assembly according to claim 7 wherein the portions of said selector element engageable with said assembly comprise a pair of spaced shoulders on the plate-like portion of said element engageable with abutment portions of a transmission shift actuating rocker of said assembly at opposite sides of the pivot axis of said rocker, said shoulders being effective to swing said rocker to a predetermined angular position of adjustment, whereat said transmission is shifted to its neutral position upon shifting of said element to its one normal position, and the plate-like portion of said one shaft also having spaced shoulders engageable with said abutment portions when said rocker is at its predetermined angular position and said one shaft is at its third position.

9. An automotive transmission control assembly comprising a plurality of individually operable transmission actuating shafts, each shaft being movable between two normal positions, one of said shafts being movable also to a third position, switching means for energizing an electrical engine starting motor, said switching means being mounted in said assembly and actuatable by said one shaft when the latter is moved to its third position, a transmission control rocker having a fixed pivot axis and a pair of abutments located at opposite sides of said axis, said rocker being pivotal to a predetermined angular position to shift said transmission to a neutral position, a selector element shiftable between two normal positions and having a pair of spaced shoulders engageable with said abutments to swing said rocker to said predetermined angular position upon shifting of said element to one of said normal positions, and means interconnecting said one shaft and element for shifting in unison between said two normal positions and being yieldable to enable shifting of said one shaft to said third position independently of said element, said one shaft also having a pair of spaced shoulders engageable with said abutments when said rocker is at its predetermined position and said one shaft is at its third position.

10. An automotive transmission control assembly comprising a plurality of individually operable transmission actuating shafts, each shaft being movable between two normal positions, one of said shafts being movable also to a third position, switching means for energizing an electrical engine starting motor, said switching means being mounted in said assembly and actuatable by said one shaft when the latter is moved to its third position, a transmission control rocker having a fixed pivot axis and a pair of abutments located at opposite sides of said axis, said rocker being pivotal to a predetermined angular position to shift said transmission to a neutral position, a selector element shiftable between two normal positions and having a pair of spaced shoulders engageable with said abutments to swing said rocker to said predetermined angular position upon shifting of said element to one of said normal positions, and resilient means interconnecting said one shaft and element for shifting in unison between said two normal positions and being yieldable to enable shifting of said one shaft to said third position independently of said element, said one shaft also having a pair of spaced shoulders engageable with said abutments when said rocker is at its predetermined position and said one shaft is at its third position.

11. An automotive transmission control assembly comprising switch means for energizing an electrical engine starting motor, a plurality of individually operable transmission actuating shafts, each shaft being movable in a given direction between first and second positions, one of said shafts being also movable in said direction beyond said second position to a third position, said one shaft having a switch operating boss effective to actuate said switch means when said one shaft is moved to its third position, a selector element also shiftable in said direction between first and second positions and having a broad portion extending in side-by-side relationship with a substantially coextensive broad portion of said one shaft, and means interconnecting said one lever and element for movement in unison between said first and second positions including spring means seated under compression within mating openings in the broad portions of said element and one shaft and yieldingly engaging juxtaposed portions of both said one element and shaft to resist relative movement between the said element and one shaft, said spring means being yieldable to enable continued limited movement of said one shaft in said direction to said third position, a pivotal transmission control rocker having a pair of abutments located at opposite sides of its pivot axis, said rocker being pivotal to a predetermined angular position to shift said transmission to a neutral position, the broad portion of said selector element having a pair of spaced shoulders engageable with said abutments to swing said rocker to said predetermined angular position upon shifting of said element in said direction to its second position, and the broad portion of said one shaft also having a pair of spaced shoulders engageable with said abutments when said rocker is at said predetermined position and said one shaft is at its third position.

12. An automotive transmission control assembly comprising a plurality of individually operable transmission actuating shafts, each shaft being movable in a given direction between first and second positions, one of said shafts being also movable in said direction beyond said second position to a third position, switching means for energizing an electrical engine starting motor, said switching means being mounted in said assembly and actuatable by said one shaft when the latter is moved to its third position, a selector element also shiftable in said one direction between first and second positions, means yieldably interconnecting said one shaft and element for moving in unison between said first and second positions and being yieldable to enable movement of said one shaft in said direction to said third position, a pivotal transmission control rocker having a pair of abutments located at opposite sides of the pivot axis of said rocker, said rocker being pivotal to a predetermined angular position to shift said transmission to a neutral position, said selector element having a pair of spaced shoulders engageable with said abutments to swing said rocker to said predetermined angular position upon shifting of said element to its second position, and said one shaft also having a pair of spaced shoulders engageable with said abutments when said rocker is at its predetermined position and said one shaft is at its third position.

13. In a control assembly for an engine transmission, switch means for actuating an electrical starting motor for said engine, a pivotal transmission control rocker operably connected with said transmission and having a pair of abutments located at opposite sides of the pivot axis for said rocker, said rocker being pivotal to a predetermined angular position to shift said transmission to a neutral condition, neutral selector means having portions engageable with said rocker abutments to shift said rocker to said predetermined position upon shifting of said selector means to a neutral condition and having other portions engageable with said switch means to actuate the same upon shifting of said selector means to a second condition, and means on said selector means separate from the first named portions and engageable with said rocker to hold the latter at said predetermined position upon shifting of said selector means to said second condition.

14. In a control assembly for an engine transmission, switch means for actuating an electrical starting motor for said engine, a pivotal transmission control rocker operably connected with said transmission and having a pair of abutments located at opposite sides of the pivot axis for said rocker, said rocker being pivotal to a predetermined angular position to shift said transmission to a neutral condition, neutral selector means having portions engageable with said rocker abutments to shift said rocker to said predetermined position upon shifting of said selector means to a neutral condition and having other portions engageable with said switch means to actuate the same upon shifting of said selector means to a second condition, and means on said selector means separate from the first named portions and engageable with said rocker to hold the latter at said predetermined position upon shifting of said selector means to said second condition, and means yieldingly connecting said first named and other portions to enable movement of said other portion to said second position independently of said first named portions.

15. In a control assembly for an engine transmission, switch means for actuating an electrical starting motor for said engine, a pivotal transmission control rocker operably connected with said transmission and having a pair of abutments located at opposite sides of the pivot axis for said rocker, said rocker being pivotal to a predetermined angular position to shift said transmission to a neutral condition, neutral selector means having a portion engageable with said switch means to actuate the same upon shifting of said selector means to an engine starting position, rocker engaging portions yieldably carried by said selector means and engageable with said rocker abutments to shift said rocker to said predetermined position upon shifting of said selector means to a neutral position, said rocker engaging portions being yieldable at said neutral position to enable shifting of said selector means to said engine starting position, and means on said selector means separate from said rocker engaging portions and engageable with said rocker abutments for holding said rocker at said predetermined position upon shifting of said selector means to said starting position.

References Cited in the file of this patent

UNITED STATES PATENTS 2,887,898     Javanovich et al. _____ May 26, 1959

UNITED STATES PATENT OFFICE

CERTIFICATION OF CORRECTION

Patent No. 2,958,322 November 1, 1960

James R. McCordic

It is hereby certified that error appears in the above numbered patent requiring correction and that the said Letters Patent should read as corrected below.

Column 1, lines 45 and 46, for "lever", each occurrence, read -- selector --; column 4, line 53, for "38" read -- 38d --; column 5, line 58, for "reltaive" read -- relative --; column 10, line 40, for "lever" read -- shaft --.

Signed and sealed this 9th day of May 1961.

(SEAL)
Attest:

ERNEST W. SWIDER
Attesting Officer

DAVID L. LADD
Commissioner of Patents